United States Patent [19]

Wyman

[11] 4,151,094
[45] Apr. 24, 1979

[54] APPARATUS FOR REMOVING SOLIDS FROM FILTER MEDIA

[75] Inventor: Floyd H. Wyman, Mauldin, S.C.

[73] Assignee: Thermo Kinetics, Inc., Greenville, S.C.

[21] Appl. No.: 837,305

[22] Filed: Aug. 15, 1977

Related U.S. Application Data

[63] Continuation of Ser. No. 591,756, Jun. 30, 1975, abandoned, which is a continuation of Ser. No. 319,748, Dec. 29, 1972, abandoned.

[51] Int. Cl.² ...................... B01D 33/14; B01D 33/38
[52] U.S. Cl. .................................... 210/396; 210/408
[58] Field of Search ................... 210/79, 82, 275, 276, 210/333 R, 333 A, 393, 396, 400, 401, 407, 408, 391, 402; 55/290, 295, 296, 301; 209/77; 15/38; 17/11, 11.1 R, 11.2, 47

[56] References Cited

U.S. PATENT DOCUMENTS

| | | | |
|---|---|---|---|
| 789,984 | 5/1905 | Macklind | 15/256.52 |
| 870,138 | 11/1907 | Stump et al. | 210/393 |
| 1,304,253 | 5/1919 | Bird | 210/396 X |
| 2,012,250 | 8/1935 | Rundell | 55/295 X |
| 2,633,993 | 4/1953 | Biggar | 210/401 X |
| 2,794,264 | 6/1957 | Scholtka | 15/38 X |
| 2,802,570 | 8/1957 | Rapp et al. | 209/390 |
| 2,858,576 | 11/1958 | Rose | 15/256.52 X |
| 3,209,429 | 10/1965 | Amtmann | 15/77 X |
| 3,437,210 | 4/1969 | O'Neill | 210/393 X |
| 3,744,450 | 7/1973 | Hardy | 55/295 X |
| 3,756,411 | 9/1973 | Kracklauer | 210/393 X |
| 3,784,018 | 1/1974 | Hope et al. | 210/393 |
| 3,795,025 | 3/1974 | Sadamitsu | 15/256.52 |
| 3,879,124 | 4/1975 | Eppe et al. | 15/256.52 |
| 3,883,292 | 5/1975 | Hamaker | 15/256.52 |

Primary Examiner—William A. Cuchlinski, Jr.
Attorney, Agent, or Firm—Bailey, Dority & Flint

[57] ABSTRACT

Apparatus and method are illustrated for removing solids from filter media supported by a backup roll wherein an elongated brush exerts a flicking action on the solids collected by the media during a filtering operation and deposits the solids upon a splash plate where the solids are collected for reclamation. Spray means are provided for directing a backwash of water across the filter media on a side thereof remote from the brush for cleansing the filter media.

2 Claims, 2 Drawing Figures

APPARATUS FOR REMOVING SOLIDS FROM FILTER MEDIA

This is a continuation of application Ser. No. 591,756, filed June 30, 1975, now abandoned; which is a continuation of application Ser. No. 319,748, filed on Dec. 29, 1972, now abandoned.

BACKGROUND OF THE INVENTION

Solids which have been filtered from fluids wherein they were suspended have, in the past, been removed from movable filter media and sometimes collected for reclamation and sometimes simply removed for cleansing the filter media, whether of the continuous belt or disposable type. U.S. Pat. No. 1,279,063 illustrates the removal of particles filtered from an ore filtering apparatus wherein rolls are rotated on opposite sides of the media in opposed relation to each other for removing the particles. U.S. Pat. No. 3,437,210 illustrates the application of a brush for claiming an unsupported web followed by the application of a spray backwash. In many applications, such apparatus would result in particles becoming even more firmly imbedded in the interstices of the porous filter media. This would be the case with the particular filter utilized herein for illustrating the invention which is described in the context of removing suspended solids from the effluent of a poultry processing plant.

It is important in the application illustrated that the solids, which are largely protein, be collected for reclamation and use such as in pet foods. The apparatus and method illustrated herein are especially useful in such applications, both because of the value of the reclaimed solids and the reduction in the sewer surcharge which is based upon the amount of solid contaminants contained in the plant effluent. While the invention is described herein in the context of a filter suitable for the particle purpose, it is to be understood that the invention has application broadly in the field in which moving filter media is employed.

Accordingly, it is an important object of this invention to provide an apparatus and method capable of removing filtered solids from filter media as by a flicking action avoiding contamination of the media as would result from smearing the particles into the interstices of the filter media.

Another important object of the invention is the provision of an apparatus and method for collecting filtered solids deposited upon filter media for reuse.

Another important object of the invention is to provide apparatus and method for cleansing a moving belt type filter media preparatory to another filtering operation.

BRIEF DESCRIPTION OF THE INVENTION

It has been found that by positioning an elongated brush closely adjacent and across a movable filter media and by rotating the brush, a flicking action will occur, resulting in the removal of solids carried thereby from the filtering action of the media. A further cleansing action is provided by a forceful application of cleaning fluid across a reverse side of the filter media flushing away particles not removed by the mechanical action of the brush. The particles removed by the brush may be collected upon an upright splash plate for reuse and if the brush is rotated with sufficient speed, a self-cleansing action will occur. The brush will continuously purge itself of contaminants by centrifugal force imparted thereto.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
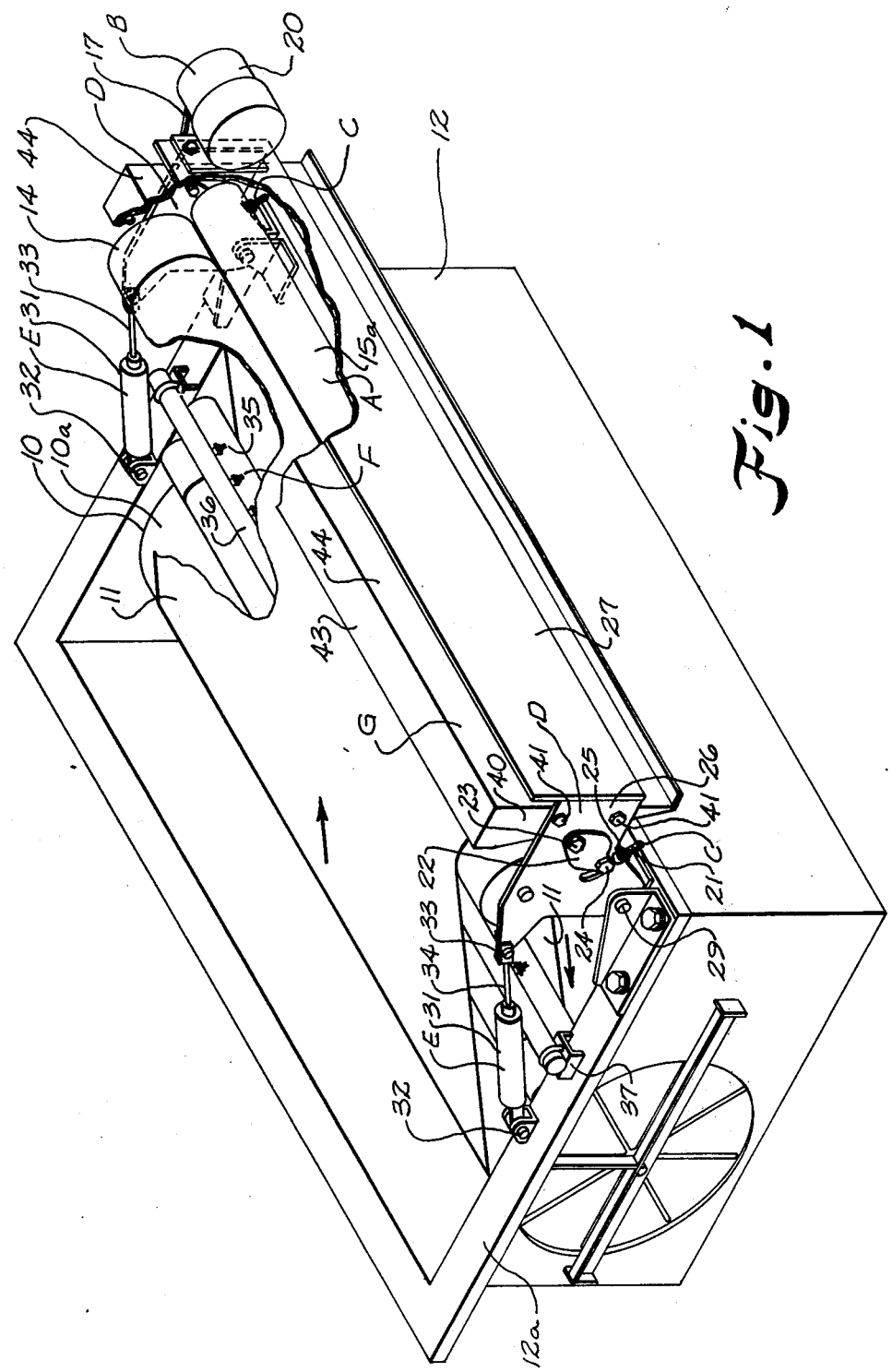
FIG. 1 is a perspective view looking toward the left hand rear or exit end of a filter apparatus constructed in accordance with the present invention illustrating the method, with parts omitted for purposes of clarity.

The drawing illustrates a liquid filter having support means for porous filter media and means moving the filter media about the filter on the support means including a backup roll about which the filter media is passed. Means for removing solids deposited upon the media during the filtering operation include a substantially horizontal elongated brush A of substantially circular cross-section carried for rotation in longitudinal alignment with the backup roll. Means B is provided for driving the brush in a direction opposed to the direction of movement of the filter media. Means C is provided for adjusting the proximity of a peripheral portion of the brush closely adjacent a point of tangency of the brush with the backup roll and the media passed thereabout. A pivotal support means D carries the backup roll and the brush adjacent each end thereof. Means E exerts a yielding force on the pivotal support means maintaining uniform tension in the filter media. Spray means F forcefully direct water across said filter media on a side thereof remote from the brush for cleansing the filter media preparatory to being subjected to further use in filtering. An upright splash plate G is carried opposite the brush for receiving solids removed from its filter media by the brush as a result of centrifugal force imparted thereto by rotation of the brush. Thus, the solids are removed from the media by a flicking action of the peripheral portion of the brush and collected for reclamation upon the splash plate.

The liquid filter illustrated may be of the type illustrated in greater detail in my co-pending application, Ser. No. 319,748, filed Dec. 29, 1972, for liquid filtering apparatus, the disclosure whereof is incorporated herein by reference.

Figure 2:
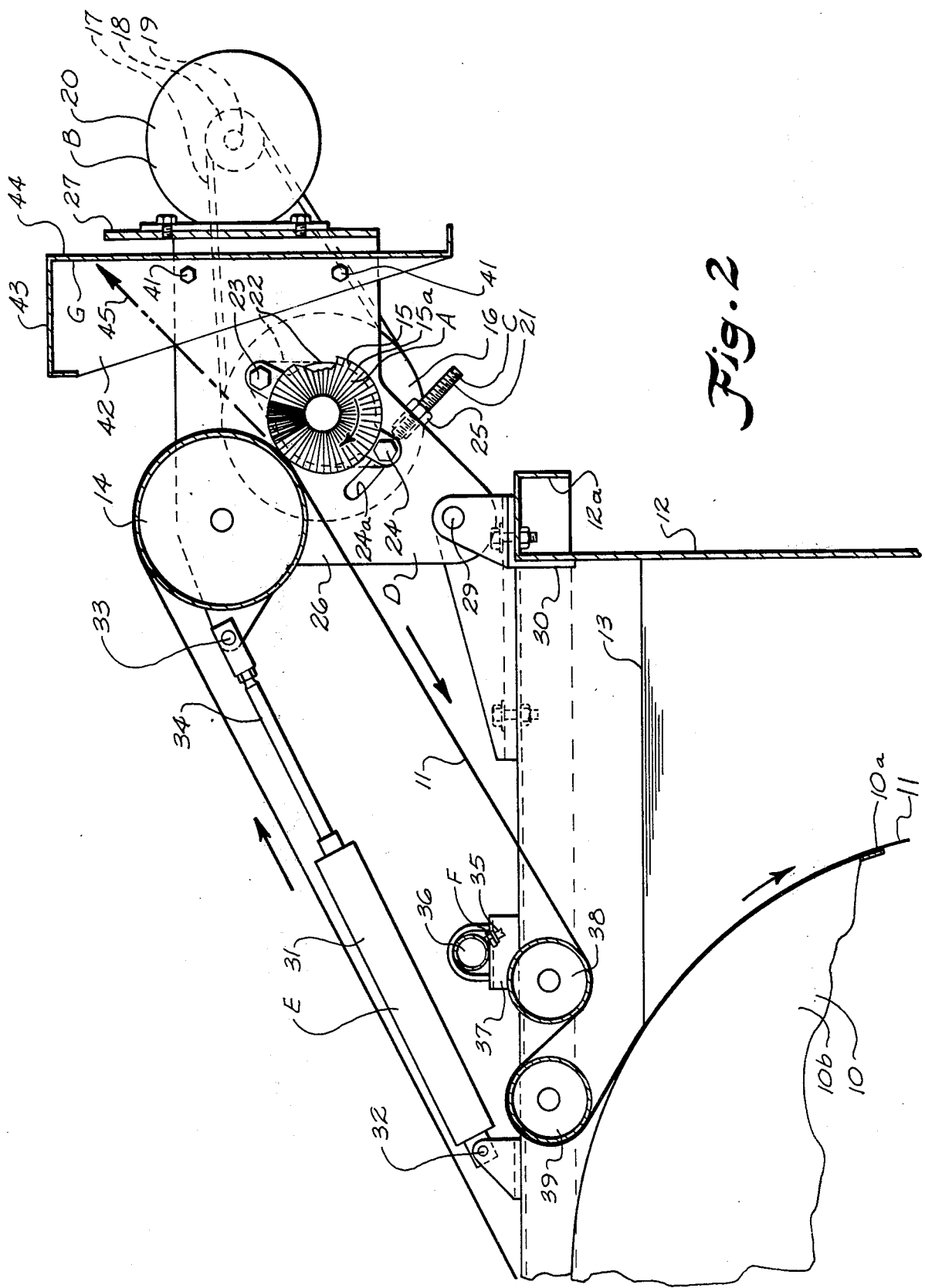
FIG. 2 is an enlarged side elevation, partially in section, further illustrating an apparatus and method in accordance with the present invention.

A rotatable drum 10 has a cylindrical perforated periphery 10a and is closed as at 10b to prevent fluid containing contaminents from flowing therein except through the media. The periphery of the drum is capable of supporting a movable filter media, illustrated in the form of a belt 11. The drum 10 is suitably driven in the direction of the arrow in FIG. 2. The drum 10 is carried within a tank 12 which contains contaminated liquid 13 such as the effluent from a poultry processing plant. In operation, the filtered liquid flows through the filter media 11 which is carried about the periphery of the drum and into the drum from whence it may be removed by any suitable means. The suspended solids are carried by the filter media about the drum which carries it in the direction of the arrow emerging from the other side of the drum and passing in the direction of the arrow about a backup roll 14 which is rotated due to frictional engagement by the media with the smooth cylindrical surface thereof.

It will be observed that the media 11, while still in engagement with the backup roll 14, is subjected to the action of the brush A. The brush A is preferably formed from synthetic radially projecting bristles 15 which define a substantially uniform periphery 15a defining a brush of substantially circular cross-section. The brush A is carried for rotation at each end thereof and, on one end, a pulley 16 (FIG. 2) is driven by a belt 17 from a pulley 18 carried by the power takeoff shaft 19 of a motor 20. The motor 20 and associated apparatus comprises the means B for driving the brush, preferably in a direction opposed to the direction of movement of the filter media as illustrated by the arrow in FIG. 2. The means C, provided for adjusting proximity of the brush to the filter media, is illustrated as including a pair of spaced threadable members 21 for adjusting supports 22 within which the ends of the brush are journaled. These supports are pivoted as at 23 and adjustably fixed adjacent the other end as by the bolt 24 which extends through the arcuate adjustment slot 24a. A locknut 25 is provided for adjusting the position of the supports 22 prior to fixing the bolts 24.

When so setting the position of the brush A adjacent a point of tangency with the media 11 backed by the backup roll 14, a piece of paper may be used as a gage and when such may just pass therebetween the brush exerts a flicking action on the suspended solids from the poultry processing plant. The desired proximity of the brush to the media is determined by the characteristics of the solids to be removed from the media. Since the brush does not exert substantial pressure on the media wear is avoided, as well as contamination of the media.

The pivotal support means D includes a pair of opposed mounting plates bridged on a right hand end portion by a plate 27. The plates 26 have pivotal connection as at 29 upon a transverse support provided in the form of an angle iron 30 which reinforces the outwardly and downwardly extending flange portion 12a which extends about the upper edge of the tank 12. It will be noted that the motor 20 is suitably mounted as upon the transverse bridging member 27.

The means E for exerting a yielding force to maintain uniform tension in the filter media, include a pair of transversely spaced fluid operated cylinders 31 which have pivotal connection on one end as at 32 upon the tank 12. The fluid operated cylinders 31 have a pivotal connection as at 33 through piston rods 34 which extend outwardly from one end thereof. While uniform tension on the media is always a desirable feature it is important that the means for exerting the tension exert a yielding force since a large foreign object such as a chicken neck passing between the rolls may otherwise damage the media or other parts. The means F, for forcefully directing water across a reverse side of the filter media, includes a plurality of spaced nozzles 35 carried by a horizontal transverse water spray pipe 36 which is mounted in suitable mounting blocks 37 adjacent each end thereof on the tank 12. It will be observed that after the application of the spray, the filter media 11 passes around a pair of spaced rolls 38 and 39 (FIG. 2) preparatory to another filtering operation.

An upright splash plate G includes a pair of longitudinal end flanges 40 which are connected as by spaced bolts 41 to the pivotal support members 26. An upper transversely extending guard surface 43 insures collection of the solids upon the transverse vertical stainless steel plate member 44 which extends between the end plate members 42. The solids are projected by centrifugal force exerted by the rotating brush A tangentially in the direction of the arrow 45 in FIG. 2. The solids which pass down the plate by gravity may then be collected in any suitable container for reclamation. While it is desirable that the splash plate be upright, such is not essential since removal means other than gravity may be provided.

While a preferred embodiment of the invention has been described using specific terms, such description is for illustrative purposes only, and it is to be understood that changes and variations may be made without departing from the spirit or scope of the following claims.

What is claimed is:

1. For use in a liquid filter having support means for a sheet of filter media and means moving filter media about said filter on said support means including a backup roll about which said filter media is passed, means for removing solids deposited upon said media during the filtering operation comprising:

an elongated brush of substantially circular cross-section carried for rotation in longitudinal alignment with said backup roll;

said brush having radially extending bristles forming a substantially uniform circular periphery;

means driving said brush;

means adjusting the proximity of a peripheral portion of said brush closely adjacent a point of tangency of said brush with the backup roll and the media passed thereabout so that said solids are removed along a tangential path from said media by a flicking action of the peripheral portion of the brush;

collection means adjacent said brush in said tangential path upon which said solids impinge; and movable support means carrying said backup roll, brush, said means driving said brush and said adjusting means.

2. The structure set forth in claim 1, wherein said movable support means is mounted for pivotal movement.

* * * * *